(12) United States Patent
Thomas et al.

(10) Patent No.: US 6,592,977 B2
(45) Date of Patent: *Jul. 15, 2003

(54) ABRASION RESISTANT COATINGS

(75) Inventors: Phillipe Andre Fernand Thomas, Helecine (BE); Walter Andre Jules Stoks, Bonheiden (BE); Anne Buegman, Brussels (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/891,640

(22) Filed: Jun. 26, 2001

(65) Prior Publication Data

US 2002/0002229 A1 Jan. 3, 2002

Related U.S. Application Data

(62) Division of application No. 09/309,229, filed on May 10, 1999, now Pat. No. 6,291,054.
(60) Provisional application No. 60/120,853, filed on Feb. 19, 1999.

(51) Int. Cl.[7] .................. B32B 5/02; B32B 27/06; B32B 27/20; B32B 27/28
(52) U.S. Cl. .................. 428/213; 428/323; 428/325; 428/328; 428/329; 428/331; 428/421; 428/422
(58) Field of Search .................. 428/141, 213, 428/323, 325, 328, 329, 331, 421, 422, 457

(56) References Cited

U.S. PATENT DOCUMENTS

| | | | |
|---|---|---|---|
| 4,197,234 A | 4/1980 | Temin | |
| 4,897,439 A | * 1/1990 | Rau et al. | 524/404 |
| 5,093,403 A | * 3/1992 | Rau et al. | 524/404 |
| 5,106,682 A | 4/1992 | Matsushita et al. | 428/324 |
| 5,198,491 A | 3/1993 | Honda et al. | 524/449 |
| 5,240,775 A | 8/1993 | Tannenbaum | 428/422 |
| 5,250,356 A | 10/1993 | Batzar | 428/421 |
| 5,478,651 A | * 12/1995 | Tannenbaum | 427/388.4 |
| 5,536,583 A | * 7/1996 | Roberts et al. | 428/457 |
| 5,562,991 A | 10/1996 | Tannenbaum | 428/421 |
| 5,783,308 A | 7/1998 | Leendersen | |
| 5,789,083 A | 8/1998 | Thomas | 428/422 |
| 5,880,205 A | * 3/1999 | Tannenbaum | 428/422 |
| 5,922,453 A | 7/1999 | Horn, III et al. | |
| 6,291,054 B1 | * 9/2001 | Thomas et al. | 427/384 |

FOREIGN PATENT DOCUMENTS

| | | |
|---|---|---|
| EP | 0 252 669 B1 | 4/1994 |
| EP | 0 857 756 A1 | 8/1998 |
| JP | 60-80883 | 5/1985 |
| WO | 98/16361 | 4/1998 |

* cited by examiner

Primary Examiner—Vivian Chen

(57) ABSTRACT

The invention provides for a substrate coated with a non-stick coating which resists abrasion force, the coating comprising a fluoropolymer resin containing ceramic particles to deflect the abrasion force away from the coating wherein the ratio of the thickness of the coating to the longest diameter of said ceramic particles is in the range of 0.8–2.0. Further, the invention provides for a substrate coated with a non-stick coating which resists abrasion force, the coating comprising an undercoat and an overcoat, each containing fluoropolymer resin, the undercoat also containing ceramic particles extending from the undercoat, the overcoat telegraphing the particles extending from the undercoat through the thickness of the overcoat to deflect the abrasion force away from the coating. Preferably, the ratio of the combined thickness of the undercoat and the overcoat to the longest diameter of the ceramic particles is in the range of 0.8–2.0. The invention further comprises a composition capable of forming an adherent coating to a smooth substrate and exhibiting abrasion resistance, comprising fluoropolymer, polymer binder and inorganic filler film hardener, wherein at least 30 wt % of the film hardener is comprised of large ceramic particles having an average particle size of at least 14 micrometers. Preferably the amount of ceramic particles is sufficient to provide at least 3 such particles per 1 cm length of transverse cross section of coating formed from said composition.

28 Claims, 4 Drawing Sheets

ABRASION RESISTANT COATINGS

This application is a divisional of U.S. Ser. No. 09/309,229, filed May 10, 1999, U.S. Pat. No. 6,291,054, which claims benefit of U.S. Provisional Application No. 60/120,853, filed Feb. 19, 1999.

FIELD OF INVENTION

This invention relates to fluoropolymer coating compositions and substrates coated with these compositions which have improved abrasion resistance.

BACKGROUND OF THE INVENTION

Fluoropolymer resins, and especially perfluoropolymer resins, are known for their low surface energy and non-stick properties as well as thermal and chemical resistance. It has long been desirable to achieve longer wearing non-stick polymer coatings on metal substrates. Of particular concern to achieving coated substrates with longer service life is the coated substrate's ability to withstand abrasion as well as its scratch resistance. "Scratch" is related to plastic deformation of the coating such as a cut from a knife or other metal tool. Abrasion refers to the amount of coating that is worn away as may occur by rubbing or sanding wherein the coating fibrillates and breaks away or shreds from the surface. In damaging a coated substrate, scratch may be followed by abrasion, in that a knife which causes plastic deformation of the coating, may also lead to the formation of fibrils which are subsequently worn away.

The problem of durability of the non-stick coating has often been viewed as one of adhesion of the coating to the metal substrate. If the coating is optimized for release so as to prevent food particles from sticking to it after cooking or to facilitate low friction sliding contact in other applications, almost by definition there will be difficulties in getting non-stick coatings to adhere well to the substrate.

Generally in the art, adhesion has been achieved by roughening the metal substrate prior to application of the non-stick coating so that mechanical bonding will assist chemical interaction of binders in a primer layer in promoting adhesion. Typical roughening includes acid-etching, sanding, grit-blasting, brushing and baking a rough layer of glass, ceramic or enamel frit onto the substrate. Other means of increasing adhesion and hence durability have included arc spraying a mechanically resistant layer of metallic materials onto a roughened metal substrate as disclosed in U.S. Pat. No. 5,411,771 (Tsai) and U.S. Pat. No. 5,462,769 (Tsai). Roughening substrate or applying a mechanically resistant metallic layer to improve adherence adds additional cost to the coating operation and in the case of chemical etching, there are additional costs of disposing etchant materials.

Prior efforts at achieving scratch-resistant coatings have included using harder auxiliary heat resistant resins along with perfluorocarbon polymers. Sometimes fillers such as mica and aluminum flake have been used in attempt to improve scratch resistance as disclosed in U.S. Pat. No. 4,180,609 (Vassilliou) and U.S. Pat. No. 4,123,401 (Berghmans et al.). Improved scratch resistance attributable to inorganic fillers and fillers of heat resistant polymers is disclosed in U.S. Pat. No. 5,106,682 (Matsushita). In U.S. Pat. No. 5,250,356 (Batzar), a multilayer system is disclosed which uses reinforced high build primer reinforced with small particle size aluminum oxide, an aluminum oxide reinforced intermediate coat and a conventional topcoat which provides release and yet shows reduced scratching. The above references all rely on grit blasting or frit coating of the aluminum substrate to achieve the proper adhesion.

All of the prior art solutions discussed above, while they may attempt to achieve longer life coatings by increasing adhesion or reducing scratch, do not address the mechanism of wear and how to deflect abrasive forces away from the coating surface.

SUMMARY OF THE INVENTION

The present invention addresses the need for a durable, non-stick coating with superior abrasion resistance. Specifically the invention provides for a substrate coated with a non-stick coating which resists abrasion force, the coating comprising a fluoropolymer resin containing ceramic particles to deflect the abrasion force away from the coating wherein the ratio of the thickness of the coating to the longest diameter of the ceramic particles is in the range of 0.8–2.0.

Further, the invention provides for a substrate coated with a non-stick coating which resists abrasion force, the coating comprising an undercoat and an overcoat, each containing fluoropolymer resin, the undercoat also containing ceramic particles extending from the undercoat, the overcoat telegraphing the particles extending from the undercoat through the thickness of the overcoat to deflect the abrasion force away from the coating. Preferably, the ratio of the combined thickness of the undercoat and the overcoat to the longest diameter of the ceramic particles is in the range of 0.8–2.0.

In another embodiment, the invention comprises a composition capable of forming an adherent coating to a smooth substrate and exhibiting abrasion resistance, comprising fluoropolymer, polymer binder and inorganic filler film hardener, wherein at least 30 wt % of the film hardener is comprised of large ceramic particles having an average particle size of at least 14 micrometers with the amount of ceramic particles being sufficient to provide at least 3 such particles per 1 cm length of transverse cross section of coating formed from said composition.

In another embodiment, the invention comprises a primer composition capable of forming an adherent coating to a smooth substrate and exhibiting abrasion resistance, comprising fluoropolymer, polymer binder and inorganic filler film hardener, the fluoropolymer to polymer binder weight ratio being 0.5 to 2.0:1 and the filler film hardener to fluoropolymer weight ratio being at least 1.4:1. Preferably the filler film hardener comprises large ceramic particles having an average particle size of at least 20 micrometers. More preferably the amount of large ceramic particles is sufficient to provide at least 3 such particles per 1 cm length of transverse cross section of coating formed from said primer composition.

DETAILED DESCRIPTION

Figure 1:
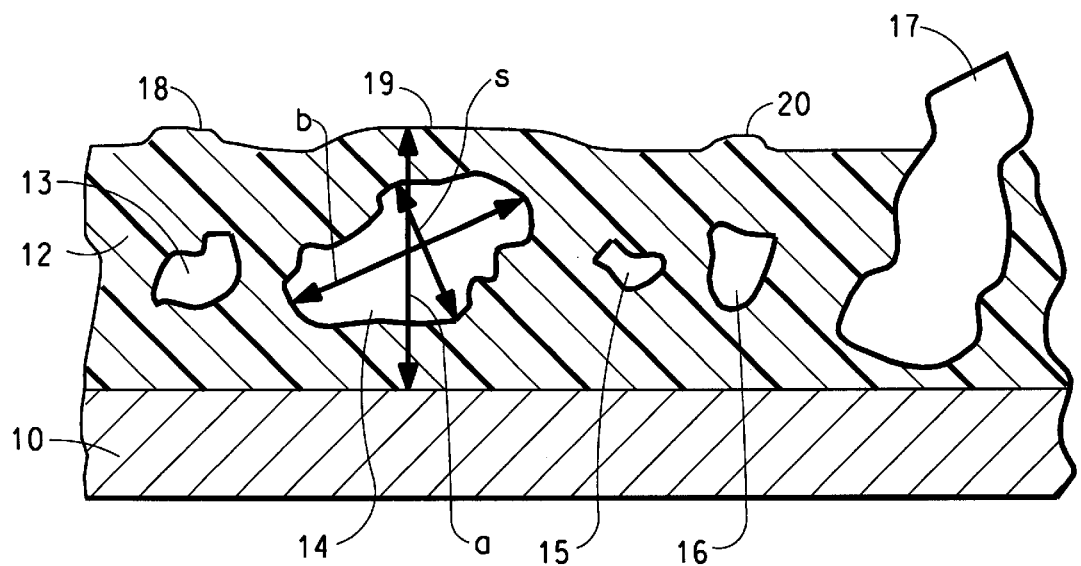
FIG. 1 is a schematic of a transverse cross-section of a substrate coated with a non-stick composition of fluoropolymer containing ceramic particles.

The present invention achieves non-stick coating compositions with superior abrasion resistance by incorporating an inorganic filler film hardener comprising large ceramic particles into fluoropolymer resin coating compositions. The large ceramic particles are contained in coating composition and when applied to a substrate, extend through the thickness of the coating telegraphing the particles so that abrasion forces are deflected away from the coating. Such deflection reduces the instances of abrasive forces shredding the coating which would result in the removal of coating. The invention is the recognition of the proper balance between using large, hard particles to deflect abrasive forces, while still retaining sufficient non-stick properties of the coating supplied by the fluoropolymer. By "large" it is meant that the particle is large when considering it to the total dry film thickness (dft) of the coating. The ratio of (a) total dry film thickness to (b) longest diameter of the ceramic particles is in the range of 0.8–2.0. FIG. 1 is a schematic of a transverse cross-section of a substrate 10, a non-stick coating 12, and filler particles 13, 14, 15, 16, and 17. The figure is illustrative of particle size definition. The arrow represented by "a" is a measure of total dry film thickness of a coating in the area where the particle is located. The arrow represented by "b" is a measure of the longest diameter of a particle. In examining the particles for a given coating thickness as illustrated in FIG. 1, particles 13, 14, and 16 have ratios within the defined range of this invention and produce deflection points 18, 19, 20 in the surface of the coating. Particles that fall within the defined ranged of the invention promote deflection points in the surface of the coating capable of withstanding abrasive forces. Particle 15 is "too small" to aid in abrasion resistance and thus no deflection point is telegraphed to the surface of the coating. Particle 17 is "too large" and actually breaks through the coating surface reducing the non-stick and low friction properties desirable in fluoropolymer coatings.

a/b ratios for an average dft of 45 micrometers

Particle 13, where b=35 micrometers: a/b=1.3—in the claimed range

Particle 14, where b=56 micrometers: a/b=0.8—maximum large

Particle 15, where b=16 micrometers: a/b=2.8—too small

Particle 16, where b=23 micrometers: a/b=2.0—minimum large

Particle 17, where b=64 micrometers: a/b=0.7—too large

A deflection point in the coating is caused by the presence of a large particle just beneath the surface of the coating which promotes the abrasion resistance. Theoretically, the ideal particle shape for the ceramic particles would be a sphere where the a/b ratio is 1.1. This would mean that a particle positioned on the substrate extends from the substrate through approximately 90% of the coating thickness, being still about 10% below the surface of the coating. However, the ceramic particles used in this invention are generally not spherical, having a large and small diameter. It is preferred that the particle be essentially surrounded by the non-stick coating and not protrude through the surface of the coating. According to this invention, for abrasion resistant coatings, the preferred number of particles in the range of 0.8 to 2.0 is at least 3 per 1 cm length of a transverse cross-section of a coated substrate.

It is also preferred that the ceramic particles have an aspect ratio of not greater than 2.5 and preferably not greater than 1.5. By aspect ratio is meant a ratio of the longest diameter "b" of the particle to the greatest distance of a dimension "s" measured perpendicular to the longest diameter (major axis) of the particle. The aspect ratio is a means of quantifying a preferred particle shape. Particles with a high aspect ratio are flat unlike the preferred particles of this invention, which are preferably more spherical and more closely approach an ideal aspect ratio of 1. If particles in a coating on a substrate are small (a/b>2.0) and have a high aspect ratio, they may be oriented parallel to a substrate and will not be able to deflect abrasive forces applied to a coated substrate. If particles are large (a/b<0.8) and have a high aspect ratio, they may be oriented pependicular to a substrate and protrude through a coating. An abrasive force may push against the tops of such particles distorting a coating and even pulling a particle from the coating, leaving a hole and causing the coating to be more rapidly abraded.

b/s Ratios

Referring to FIG. 1, aspect ratios b/s for particles within the claimed range of this invention are

| Particle 13 | b/s = 1.7 |
| Particle 14 | b/s = 1.8 |
| Particle 16 | b/s = 1.2 |

However, Particle 17 is considered "too large" for the coating system illustrated in FIG. 1 and has a b/s ratio=2.5. Particle 15 is considered "too small" for the coating system illustrated in FIG. 1 and therefore its aspect ratio is not of consequence.

In a multilayer coating system comprising a substrate coated with an undercoat and an overcoat each containing fluoropolymer resin, the ceramic particles are preferably contained in the undercoat and extend from the undercoat through the thickness of the overcoat telegraphing the particles so that abrasion forces are deflected away from the coating. By "undercoat" it is meant any coating under the surface coating which may be a primer coating or one or more intermediate coatings containing particles defined by this invention. By "overcoat" it is meant one or more additional intermediate coatings or a topcoat which telegraph the particles extending from the undercoat through the thickness of the coating. The ratio of the combined thickness of the undercoat and the overcoat to the longest diameter of ceramic particles is in the range of 0.8–2.0. The number of ceramic particles in the undercoat extending from the undercoat and telegraphing the particles through the thickness of the undercoat to deflect abrasion force away from the coating is at least 3 per 1 cm length, preferably at least 10 per 1 cm length, more preferably at least 15 per 1 cm length, and most preferably at least 25 per 1 cm length.

In a single-coat system comprising a substrate coated with a non-stick coating, the coating contains a fluoropolymer resin with ceramic particles to deflect said abrasion force away from said coating wherein the ratio of the thickness of the coating to the longest diameter of said ceramic particles is in the range of 0.8–2.0. The number of ceramic particles in the coating to deflect abrasion force away from the coating is at least 3 per 1 cm length, preferably at least 10 per 1 cm length, more preferably at least 15 per 1 cm length, and most preferably at least 25 per 1 cm length.

Fluoropolymer Resin

The fluoropolymer component of the non-stick coating composition of this invention is preferably polytetrafluoroethylene (PTFE) having a melt viscosity of at least $1 \times 10^8$ Pa·s at 380° C. for simplicity in formulating the composition and the fact that PTFE has the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity, usually at least $1 \times 10^9$ Pa·s, but a mixture of PTFEs having different melt viscosities can be used to form the fluoropolymer component. Use of a single fluoropolymer in the composition, which is the preferred condition, means that the fluoropolymer has a single chemical identity and melt viscosity.

While PTFE is preferred, the fluoropolymer component can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3–6 carbon atoms and perfluoro(alkyl vinyl ethers) (PAVE) wherein the alkyl group contains 1–5 carbon atoms, especially 1–3 carbon atoms. Especially preferred comonomers include hexafluoropropylene (HFP), perfluoro(ethyl vinyl ether) (PEVE), perfluoro(propyl vinyl ether) (PPVE) and perfluoro (methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the primer application. Typically, the melt viscosity will be at least $1 \times 10^2$ Pa·s and may range up to about $60-100 \times 10^3$ Pa·s as determined at 372° C. according to ASTM D-1238.

The fluoropolymer component is generally commercially available as a dispersion of the polymer in water, which is the preferred form for the composition of the invention for ease of application and environmental acceptability. By "dispersion" is meant that the fluoropolymers particles are stably dispersed in the aqueous medium, so that settling of the particles does not occur within the time when the dispersion will be used; this is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Alternatively, the fluoropolymer component may be a fluoropolymer powder such as PTFE micropowder. In which case, typically an organic liquid is used in order to achieve an intimate mixture of fluoropolymer and polymer binder. The organic liquid may be chosen because a binder dissolves in that particular liquid. If the binder is not dissolved within the liquid, then the binder can be finely divided and be dispersed with the fluoropolymer in the liquid. The resultant coating composition can comprise fluoropolymer dispersed in organic liquid and polymer binder, either dispersed in the liquid or dissolved in order to achieve the intimate mixture desired. The characteristics of the organic liquid will depend upon the identity of the polymer binder and whether a solution or dispersion thereof is desired. Examples of such liquids include N-methylpyrrolidone, butyrolactone, high boiling aromatic solvents, alcohols, mixtures thereof, among others. The amount of the organic liquid will depend on the flow characteristics desired for the particular coating operation.

Polymer Binder

A fluoropolymer composition of this invention preferably contains a heat resistant polymer binder. The binder component is composed of polymer which is film-forming upon heating to fusion and is also thermally stable. This component is well known in primer applications for non-stick finishes, for adhering the fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form.

An example of the binder component is polyamic acid salt which converts to polyamideimide (PAI) upon baking of the composition to form the primer layer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Other binders that can be used include polyether sulfone(PES) and polyphenylene sulfide (PPS).

Whether the primer composition is applied as a liquid medium, wherein the liquid is water and/or organic solvent, the adhesion properties described above will manifest themselves upon drying and baking of the primer layer together with baking of the next-applied layer of fluoropolymer to form the non-stick coating of the substrate.

For simplicity, only one binder may be used to form the binder component of the composition of the present invention. However, multiple binders are also contemplated for use in this invention, especially when certain end-use properties are desired, such as flexibility, hardness, or corrosion protection. Common combinations include PAI/PES, PAI/PPS and PES/PPS.

The proportion of fluoropolymer and binder, especially if the composition is used as a primer layer on a smooth substrate, is preferably in the weight ratio of 0.5 to 2.0:1. The weight ratios of fluoropolymer to binder disclosed herein are based on the weight of these components in the applied layer formed by baking the composition after application to its substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will constitute about 5 to 50 wt % of the total dispersion.

Inorganic Film Hardener

The inorganic filler film hardener component is one or more filler type materials which are inert with respect to the other components of the composition and thermally stable at its eventual baking temperature which fuses the fluoropolymer and binder. The film hardener is water insoluble so that it is typically uniformly dispersible but not dissolved in the aqueous dispersion form of the composition of the invention. Typically, the filler film hardener of this invention preferably comprises large ceramic particles having an average particle size of at least 14 micrometers, preferably at least 20 micrometers, and more preferably at least 25 micrometers.

Further the ceramic particles of the inorganic film hardener preferably have a Knoop hardness of at least 1200 and more preferably of at least 1500. Knoop hardness is a scale for describing the resistance of a material to indentation or scratching. Values for the hardness of minerals and ceramics are listed in the *Handbook of Chemistry*, 77$^{th}$ Edition, 12-186,187 based on reference material from Shackelford and Alexander, *CRC Materials Science and Engineering Handbook*, CRC Press, Boca Raton Fla., 1991. The film hardener component imparts durability to the non-stick fluoropolymer composition applied as a coating on a substrate by deflecting abrasive forces applied to the coating surface and by resisting penetration of sharp objects that have penetrated the fluoropolymer overcoat.

The ceramic particles of the inorganic film hardener preferably have an aspect ratio (as defined above) of not greater than 2.5, and more preferably not greater than 1.5. Preferred particles of this invention, which are able to deflect abrasive forces applied to a coating containing the particles, have an aspect ratio of not greater than 2.5 and a size wherein the largest diameter of the particle is at least 50% of the coating thickness and does not exceed 125% of the coating film thickness.

Preferably the coating composition comprises at least 30 wt % of filler film hardener containing large ceramic particles that have an average particle size of at least 14 micrometers, preferably at least 20 micrometers, and more preferably at least 25 micrometers. Preferably the amount of the large particles is sufficient to provide at least 3 such particles per 1 cm length of transverse cross-section of coating formed from the composition.

As described above the average particle size measurement is typical of particle sizes of this invention, but the particle size of suitable ceramic particles is a function of the ratio of the particle size to the total dry film thickness of the coating. The ratio of (a) total dry film thickness to (b) longest diameter of the ceramic particles is in the range of 0.8–2.0. Thus for single coat systems or systems with low film builds the average particle size needed for the invention will be smaller than those particles required for multi-coat systems or systems with higher film builds. The ceramic particles contained in a coating composition and applied to a substrate extend through the thickness of the coating telegraphing the particles so that abrasion forces are deflected away from the coating.

Examples of inorganic filler film hardener include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850).

Other Fillers

In addition to the large particles of inorganic filler film hardener, the non-stick coating compositions of this invention may contain smaller particles of inorganic filler film hardener as well as other filler materials having a Knoop hardness value of less than 1200. Preferably the filler film hardener to fluoropolymer resin weight ratio is at least 1.4:1. More preferably at least 30 wt % of the filler film hardener are large ceramic particles having an average particle size of at least 14 micrometers, preferably at least 20 micrometers, and more preferably at least 25 micrometers and the amount of the large particles is sufficient to provide at least 3 such particles per 1 cm length of transverse cross section of coating formed from the composition.

Suitable additional fillers include small particles of aluminum oxide, calcined aluminum oxide, silicon carbide etc. as well as glass flake, glass bead, glass fiber, aluminum or zirconium silicate, mica, metal flake, metal fiber, fine ceramic powders, silicon dioxide, barium sulfate, talc, etc.

Coating Application

The compositions of the present invention can be applied to substrates by conventional means. Spray and roller application are the most convenient application methods, depending on the substrate being coated. Other well-known coating methods including dipping and coil coating are suitable. The non-stick coating compositions may be a single coat or a multi-coat system comprising an undercoat and an overcoat. The overcoat of one or more fluoropolymer-containing layers can be applied by conventional methods to the undercoat layer prior to its drying. When the undercoat and overcoat layer compositions are aqueous dispersions, the overcoat composition can be applied to the undercoat layer preferably after drying to touch. When the undercoat layer is made by applying the composition from an organic solvent, and the next layer (intermediate coat or topcoat) is applied from an aqueous medium, the undercoat layer should be dried so that all water-incompatible solvent is removed before application of such next layer.

A resultant composite structure can be baked to fuse all the coatings at the same time to form a non-stick coating on the substrate. When the fluoropolymer is PTFE, a quick high bake temperature is preferred, e.g., for 5 min. at a temperature starting at 800° F. (427° C.) and rising to 825° F. (440° C.). When the fluoropolymer in the primer or the overcoat is a blend of PTFE and FEP, e.g., 50–70 wt % PTFE and 50–30 wt % FEP, the bake temperature may be reduced to 780° F. (415° C.), rising to 800° F. (427° C.) in 3 minutes (total bake time). The baked undercoat layer thickness is measured with film thickness instruments based on the eddy-current principle (ASTM B244) or magnetic induction principle (ASTM B499) and will generally be between 5–20 micrometers. The overcoat layer thickness will generally be from 10–25 micrometers (for both the intermediate coat layer and the topcoat layer).

In the resultant composite structure, the substrate can be of any material which can withstand the bake temperature, such as metal and ceramics, examples of which include aluminum, anodized aluminum, cold-rolled steel, stainless steel, enamel, glass, and pyroceram. The substrate can be smooth, i.e. having a surface profile of less than 50 microinches (1.25 micrometers) as measured by a model RT 60 surface tester made by Alpa Co. of Milan, Italy, and needs to be clean. For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073 to Tannenbaum. When the undercoat layer is a primer, it can be considered as the first fluoropolymer-containing layer on the substrate, and preferably the primer layer is directly bonded to the substrate.

Products have non-stick finishes made using compositions of the present invention include cookware, bakeware, rice cookers and inserts therefor, water pots, iron sole plates, conveyors, chutes, roll surfaces, cutting blades, etc.

Test Methods

Taber Abrasion Test—An abrasion test is conducted generally according to ASTM D4060 wherein the surface of a film is subjected to the wear of two abrasive wheels at a known load. The weight loss and the dft loss are a measure of the resistance of a film to abrasion and is determined after a specified number of cycles. The apparatus used is a Taber Abrasion Model 503, from the Taber Instrument Company. All Taber testing is done with CS17 abrasive wheels/1 kg load/1000 cycles except where noted differently. The wheels are cleaned to refresh the abrasive surface every 250 cycles.

Sand Paper Abrasion Test (SPAT)—Samples of non-stick coated aluminum panels (10 cm×30 cm) are abraded with squares (5 cm×5 cm) pieces of sandpaper. The sandpaper has a rough surface and a pressure adhesive coated soft side. For purposes of the test, the soft side is adhered to a soft sponge (7×7×2.5 cm) leaving the rough side of the sandpaper exposed. The rough side of the sandpaper is applied against the non-stick coating under a constant specified load. The sandpaper is oscillated back and forth across a total length of 16.4 cm at a frequency of 53 cycles per minute. After a specified number of cycles, the sandpaper is replaced by a new piece of sandpaper. The film thickness of the coating is measured initially and after a specified number of cycles. The measurement is performed at the center of the track formed by the abrading sandpaper. I.e., approximately 8 cm from both sides. Abrasion is expressed by the loss of film thickness as a function of the number of cycles.

Mechanical Tiger Paw Abrasion Test (MTP) A coated substrate is continuously scratched with three point pen tips which are held by a weighted holder (400 g total weight) which rotates the pens against and around the surface of the coated substrate. To accelerate the failure of the entire thickness of the coating, i.e., the rotation of the pens produces a continuous circular-shaped path penetrating the entire coating to reach the substrate, the substrate is heated at 200° C. during this scratch test, and the time to such failure is recorded. The longer the time to failure, the better the durability of the non-stick coating.

Mechanical Utensil Scratch Test—(MUST) Samples of non-stick coated aluminum substrates are tested for both abrasion and scratch resistance by applying a triangular metal lathe bit to the coated surface. The triangular lathe bit is a tungsten carbide turning insert, TNMG 322, commercially available from MSC Industrial Supply Company, Plainview, N.Y. The coated substrate is mounted on a hot plate heated to a temperature of 400° F. (204° C.) to simulate cooking conditions. The coated substrate is subjected to the movement of a reciprocating arm mounted with the triangular bit under a specified load of 1.6 Kg. The bit is oscillated at a frequency of 1 cycle per second across the non-stick surface creating a wear pattern 3 mm×53 mm. The bit is permitted to oscillate until one observes the first appearance of bare metal in the groove made by the bit. Upon this observation the test is stopped and the total number of cycles is recorded. The test is repeated three times and the average number of cycles to failure is recorded.

EXAMPLES

Fluoropolymer

PTFE micropowder: Zonyl® Fluoroadditive grade MP 1600, available from the DuPont Company, Wilmington, Del.

PTFE—1 dispersion: TFE fluoropolymer resin dispersion with standard specific gravity (SSG) 2.25 measured according to ASTM D4895 and raw dispersion particle size (RDPS) 0.25–0.28 micrometers.

PTFE—2 dispersion: DuPont TFE fluoropolymer resin dispersion grade 30, available from the DuPont Company, Wilmington, Del.

FEP dispersion: TFE/HFP fluoropolymer resin dispersion with a solids content of from 54.5–56.5 wt. % and RDPS of from 150–210 nanometers, the resin having an HFP content of from 9.3–12.4 wt. % and a melt flow rate of 11.8–21.3 measured at 372° C. by the method of ASTM D-1238 modified as described in U.S. Pat. No. 4,380,618.

PFA dispersion: DuPont PFA fluoropolymer resin dispersion grade 335, available from the DuPont Company, Wilmington, Del.

Polymer Binder

Two polyamideimide resins are used:

PAI-1 (in Example 1) is a 36 wt % solution of PAI resin in an NMP-based solvent containing naptha and butyl alcohol in ratio NMP/naptha/alcohol=40.5/21.5/2.0 (grade PD-10629, Phelps-Dodge Magnet Wire Co.).

PAI-2 (in Example 3) is Torlon® AI-10 poly(amide-imide) (Amoco Chemicals Corp.), a solid resin (which can be reverted to polyamic salt) containing 6–8% of residual NMP.

Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

PPS Polyphenylene Sulfide Resin Ryton VI from Phillips Petroleum

Inorganic Film Hardener

Silicon carbide supplied by Elektroschmelzwerk Kempten GmbH (ESK), Munich Germany P 1200=15.3±1 micrometers average particle size P 600=25.8±1 micrometers average particle size P 400=35.0±1.5 micrometers average particle size P 320=46.2±1.5 micrometers average particle size The average particle size is measured by sedimentation using FEPA-Standard-43-GB 1984R 1993 resp. ISO 6344 according to information provided by the supplier.

Aluminum oxide supplied by Universal Abrasives, Stafford, England.

| | |
|---|---|
| F1200 | 3 micrometers average particle size |
| F 500 | 12.8 micrometers average particle size |
| F 360 | 22.8 micrometers average particle size |
| F 240 | 44.5 micrometers average particle size |

The average particle size is measured by sedimentation using FEPA-Standard-42-GB-1984 according to information provided by the supplier.

Example 1—Single-coat System, Silicon Carbide

A non-stick coating composition comprising PTFE resin, polyamide imide binder and solvent is prepared according to the composition in Table 1 and to 100 grams of this composition, varying amounts of three grades of silicon carbide having different average particle sizes and a Knoop hardness of 2500–2900 are added as shown in Table 2.

TABLE 1

| Single-Coat | |
|---|---|
| Ingredients | Weight Percent |
| PTFE micropowder | 11.050 |
| PAI-1 | 12.056 |
| Melamine/formaldehyde resin | 1.839 |
| Carbon black pigment | 1.660 |
| N-butanol | 2.058 |
| Methyl isobutyl ketone | 17.530 |
| N-methyl-2-pyrrolidone | 46.607 |
| Naphta | 7.200 |
| Total | 100.000 |

A single layer of the coating composition is applied to cold rolled carbon steel substrates which are smooth, having been treated only by washing to remove grease but have not been mechanically roughened. The coating is applied by spray coating. The coating is baked at a temperature of 350° C., unless otherwise specified. The dry film thickness of the coating is measured and listed Table 2. The coated substrates are subjected to the Taber abrasion test as described above and the % abrasion (i.e., % lost film thickness divided by total dry film thickness initial×100) is listed in Table 2. All Taber testing is with CS17/1 kg/1000 cycles except where noted differently. The coated substrates of examples 1-3, 1-4, 1-6, and 1-7 are sectioned and viewed with a scanning electron microscope (SEM).

TABLE 2

| Abrasion Resistance, Single-Coat | | | | |
|---|---|---|---|---|
| Sample | SiC* (g) | Grade ESK | bake temperature ° C. | dft initial microns |
| 1-1 | 0 | | 350 | 24.6 |
| 1-2 | 3.0 | P1200 | 350 | 26.8 |
| 1-3 | 4.5 | P1200 | 300 | 38.9 |
| 1-4 | 3.0 | P600 | 350 | 19.5 |
| 1-5 | 3.0 | P600 | 350 | 29.2 |
| 1-6 | 3.0 | P600 | 350 | 36.1 |
| 1-7 | 5.0 | P600 | 350 | 59.7 |
| 1-8 | 5.0 | P600 | 350 | 26.8 |
| 1-9 | 5.0 | P400 | 350 | 31.6 |
| 1-10 | 5.0 | P400 | 350 | 47.1 |

TABLE 2-continued

| Abrasion Resistance, Single-Coat | | | | |
|---|---|---|---|---|
| Example | dft microns | TABER Delta weight (gr) | Abrasion %** | a/b |
| 1-1 | 24.6 | 0.088 | 100 | |
| 1-2 | 6.0 | 0.016 | 22 | |
| 1-3 | 7.0 | 0.016 | 18 | 1.8 |
| 1-4 | 0.7 | 0.047 | 4 | 1.0, 1.0 |
| 1-5 | 9.7 | 0.015 | 33 | |
| 1-6 | 6.7 | 0.009 | 19 | 1.4, 1.7 |
| 1-7 | 13.3 | 0.02 | 22 | 1.7, 1.5 |
| 1-8 | 11.1 | 0.028 | 41 | |
| 1-9 | 19.4 | 0.072 | 61 | |
| 1-10 | 8 | 0.02 | 17 | |

*SiC (g) = grams added to 100 grams fluoropolymer composition listed in Table 1 (which has a solids of 25 wt % - formulation see above
**lost film build divided by dft initial × 100

As shown in example 1-1, with no addition of SiC, all the coating is worn. The abrasion is 100%. As shown in examples 1-2 to 1-10 the addition of 3–5% SiC reduces the wear significantly with the percent abrasion varying from 4 to 61%. The lower abrasion performance (61%) shown in example 1-9 suggests that the a/b ratio is less than 0.8 because the P-400 grade has about 3% of the particles in the range of 48.2–77 micrometers (supplier information) and such particles are too large for an average film thickness of 31.6 micrometers. Particles of this size protrude through the coating surface and detract from the desired non-stick properties of the composition.

The best abrasion result is obtained by the addition of 3% SiC type P600 having an average particle size of 25.8±1 micrometers and a/b ratio in the range of 1.0 or lower, i.e., the size of the SiC particles are about the same or higher than the average film thickness. Although the abrasion resistance of such film is excellent, the film texture may be somewhat rough and may affect other properties such as release or gloss. As previously described, for a satisfactory system, a balance between abrasion resistance and release must be achieved.

Examples 1-3, 1-4, 1-6, and 1-7 show the presence of "large" particles as defined by the a/b ratio falling in the range 0.8–2.0. The a/b ratio for several particles in a cross-section is listed. The number of deflection points in the surface of the coating was also higher than 3 points/cm of cross section. For the sample 1-3 there are about 65 large particles per 1 cm length of a transverse cross-section of the coating (i.e., 65 particles wherein the a/b ratio is in the range of 0.8–2.0).

Example 1 shows that the presence of "large" SiC particles improves abrasion resistance of a single coat system. However, smaller particles with ratios a/b of more than 2 may also be beneficial for the abrasion resistance in a single coat system because some of the smaller particles may reside closer to the surface of the coating than to the substrate promoting additional deflection points in the coating surface.

Example 2—Multi-coat System, Aluminum Oxide in Primer

A 3-coat system of primer/intermediate/topcoat is applied to aluminum substrates by roller coating, i.e., where the coating is applied to the substrate by a series of rollers. The substrates are smooth, being washed to remove grease but not being mechanically roughened.

A primer composition as described in Table 3 promotes adhesion to the metal substrate and is applied at an average film thickness of 3 micrometers.

TABLE 3

Primer Composition

| Ingredient | Weight Percent |
|---|---|
| Carbon Black Pigment | 1.83 |
| Aluminum Silicate Extender | 0.92 |
| "LudoxTM" sodium stabilized Colloidal Silica from Du Pont | 2.13 |
| PTFE-1 (MV $10^{10}$ Pa Sec) | 8.61 |
| FEP (MV 2–4 × $10^3$ Pa Sec) | 5.74 |
| PAI-2 | 4.79 |
| Sodium Polynaphthalenesulfonate Anionic Surfactant | 0.26 |
| Surfynol 440 Nonionic Surfactant from Air Products | 0.26 |
| Deionized Water | 65.74 |
| Octylphenotpolyethoxy nonionic surfactant | 0.31 |
| Diethylethanol Amine | 0.68 |
| Triethylamine | 1.35 |
| Furfuryl Alcohol | 3.72 |
| N-Methylpyrrolidone | 3.14 |
| Nonylphenolpolyethoxy nonionic surfactant | 0.52 |
| Total | 100 |

The composition for the intermediate contains PTFE, polymer binder and about 15 wt % fused alumina having a Knoop hardness of ~2100 for examples 2-2 to 2-4 is listed in Table 4. For comparison, the intermediate of example 2-1 contains no aluminum oxide. The intermediate compositions in examples 2-2 to 2-4 vary by the grade of alumina added, each grade varying in the average particle size as shown in Table 6. In example 2-2, particles of F-1200 (3 micrometers average particle size) are added to the intermediate. In example 2-3 a blend of two different particle sizes of alumina (F500 and F360 in a 33/66 ratio) are added. In example 4, particles of F-240 (44.5 micrometers average particle size) are added. The role of the intermediate is to promote adhesion and flexibility of the coating and is applied at an average film thickness of 5–8 micrometers. The intermediate functions as the undercoat.

TABLE 4

Intermediate Composition

| Description | Weight Percent |
|---|---|
| Titanium dioxide | 6.21 |
| Carbon black | 2.26 |
| Aluminum silicate | 1.13 |
| Barium sulfate | 3.66 |
| Fused alumina | 14.69 |
| PTFE-1 | 24.02 |
| Acrylic polymer | 1.74 |
| Polyphenylene sulfide | 3.66 |
| Surfynol 440 surfactant | 0.29 |
| Sodium polynaphthalenesulfonate surfactant | 0.37 |
| Octylphenolpolyethoxy nonionic surfactant | 0.73 |
| Nonylphenolpolyethoxy nonionic surfactant | 1.44 |
| Butylglycol | 0.73 |
| Water | 37.09 |
| Triethanolamine | 1.98 |
| Total | 100 |

TABLE 4-continued

Intermediate Composition

| Description | Weight Percent |
|---|---|
| % weight solids = 56% | |
| P/B = 99.6 (prime pigment = 30.2; extender = 36.21) | |
| Binder = 3.66 | |
| Fluoropolymer = 24.02 | |
| F/B = 6.6 | |

The topcoat composition of composition as described in Table 5 provides the non-stick (release) property and is applied at about 15 micrometers. The topcoat functions as the overcoat.

TABLE 5

Topcoat

| Ingredients | Weight Percent |
|---|---|
| "Afflair" 153 Titanium dioxide Coated Mica flake from Merck | 4.92 |
| Carbon black pigment | 0.26 |
| Aluminum Silicate extender | 0.13 |
| PTFE-1 | 40.65 |
| Sodium polynaphthalenesulfonate surfactant | 0.04 |
| Bevaloid 680 anti form agent from BELALOID | 0.35 |
| Water | 41.64 |
| Triethenolamine | 6.99 |
| Acrysol RM5 acrylic thickening agent from Rohm and Haas | 2.51 |
| Nonylphenylpolyethoxy non-ionic surfactant | 2.51 |
| Total | 100 |

The roller coat application technique is characterized by the formation of chicken tracks (irregular flow of the film). As a consequence of the chicken tracks the film build can vary between 7 and 70 micrometers (in the extreme cases) with an average film build of 20–30 microns.

The multiple layers of coating system are applied sequentially wet-on-wet with minimal drying and no curing between coats, then the coated system is cured such as at about 400° C. for a minimum of three minutes. The multi-coat system has a dry film thickness averaging 25 micrometers. The substrates are subjected to the SPAT abrasion test as described above. The SPAT abrasion test is performed as described in the test methods above. The sandpaper is aluminum oxide P-220, STIKIT™ 255 RD 800 B from The 3M Company, having an aluminum grain size of 55 micrometers average. The specified load is 1.250 Kg. The test is run for 400 cycles changing the abrasive paper every 100 cycles.

The results of this abrasion test are illustrated in Table 6. The coated substrates are sectioned and viewed with a scanning electron microscope (SEM) to determine the a/b ratio (i.e., the ratio of the coating thickness in relation to the longest dimension of a particle) and the number of particles with an a/b ratio of 0.8–2.0 per 1 cm length of a transverse cross section of the coating.

TABLE 6

Abrasion Resistance, Multi-Coat

| Example | Grade Alumina* | Abrasion 400 Cycles (break-through) | Deflection Points/cm | a/b | b/s |
|---|---|---|---|---|---|
| 2-1 | None | Intense wear | None | None | None |
| 2-2 | F1200 | Medium wear | None | 3.5, 5.9 | 1.8; 1.8 |
| 2-3 | F500 & F360 (33/66) | Little wear | 10 | 1.3, 1.7, 2.9 | 2.5; 3.7; 1.5 |
| 2-4 | F240 | None | 7 | 1.5 | 1.2 |

*from Universal Abrasives

The results in Table 6 show that as the alumina particle size increases, the abrasion resistance improves. As shown in example 2-1, with no addition of aluminum oxide, the substrate is intensely worn revealing bare metal. For example 2-2, a medium amount of wear is visible suggesting that F 1200 particles (3 micrometers average particle size) are too small for a this multi-coat system. Example 2-3 with larger F500/F360 alumina particles withstands the abrasion of the SPAT test with little wear and no wear is noticeable in example 2-4 when even larger F240 alumina particles are added.

These results are further confirmed when examining the b/s ratios. Example 2-2 has particles of preferred shape but such particles are too small as evidenced by the high a/b ratios. Particles of Example 2-3 demonstrate the preferred particle shape and Example 2-4 with the preferred particle shape exhibits optimum abrasion resistance.

For example 2-3, the SEM shows there are 10 large particles per 1 cm length of a transverse cross section of the coating (10 particles within the range a/b=0.8–2.0) resulting in 10 deflection points on the coating surface. For example 2-4, the SEM there are 7 large particles per 1 cm length of a transverse cross section of the coating (7 particles within the range a/b=0.8–2.0) resulting in 7 deflection points on the coating surface. For examples 2-1 with no alumina and 2-2 with particles of alumina having a small average particle size and a/b ratios>2, there are no deflection points in the surface of the coating consistent with poor performance in the abrasion tests.

For multiple coat systems such as described in Example 2, the large particles are added to the undercoat only. They must be large enough to extend from the undercoat and be telegraphed through the thickness of the overcoat to create deflection points in the surface of the coating. Therefore, in multi-coat system, small particles in the intermediate are unlikely to cause any additional abrasion improvement as can be seen in the one coat system of Example 1.

Example 3—Multi-coat System, Silicon Carbide in Primer

A 3-coat non-stick system of primer/intermediate coat/topcoat with SiC particles in the primer is sprayed onto a smooth aluminum substrate, which has been treated only by washing to remove grease but not mechanically roughened. The SiC powder is a blend of three grades P320/P400/P600 at the weight ratio of 20/40/40. The average particle size are as specified above. The composition of the primer is listed in Table 7. The primer functions as the undercoat and is applied on a smooth aluminum substrate and dried. The surface texture looks like sandpaper.

The intermediate coat is then sprayed over the dried primer. The topcoat is applied wet on wet to the intermediate coat. The compositions of the intermediate coat and the topcoat are listed in Tables 8 and 9 respectively. The intermediate coat and the topcoat function as overcoats. The coating is cured by baking at a temperature of 430° C.

It is important to apply the primer/intermediate coat/topcoat at a controlled film build, respectively 15–20/15/5–10 micrometers. Because the surface of the primer is very rough, the valleys are filled by the intermediate coat and topcoat. The large SiC particles extend from the primer (undercoat) through the thickness of the overcoat lying just below the top in order to create deflection points in the surface of the coating. These large particles promote deflection points that are needed to resist abrasion.

The coated substrate is subjected to the MTP abrasion test, SPAT abrasion test, and the MUST scratch and abrasion test as described above. The coated substrate is also sectioned and viewed with a scanning electron microscope (SEM).

In the SPAT test, the specified load is 4.211 Kg and the sandpaper is aluminum oxide P320 (45 micrometers average grain size), type RDB 800B from The 3M Company. The sandpaper is renewed every 50 cycles. The film thickness is measured initially and after every 50 cycles.

TABLE 7

Primer Composition

| Ingredients | Weight Percent |
|---|---|
| PAI-1 | 4.28 |
| Water | 59.35 |
| Furfuryl Alcohol | 3.30 |
| Diethylethanolamine | 0.60 |
| Triethylamine | 1.21 |
| Triethanolamine | 0.20 |
| N-Methylpyrolidone | 2.81 |
| Furfuryl Alcohol | 1.49 |
| Surfynol 440 surfactant | 0.22 |
| SiC P400 | 3.30 |
| SiC P600 | 3.30 |
| SiC P320 | 1.66 |
| PTFE-2 (solids in aqueous dispersion) | 3.86 |
| Alkylphenylethoxy surfactant | 1.59 |
| FEP (solids in aqueous dispersion) | 2.65 |
| Ludox AM polysilicate | 0.87 |
| Utramarine blue pigment | 1.63 |
| Carbon black pigment | 0.28 |
| Alumina 0.35–0.50 micrometers | 7.40 |
| Total | 100 |

% solids = 30.4
P/B = 142%
Density = 1.21
Vol. Sol. = 15.16%

TABLE 8

Intermediate Coat

| Ingredients | Weight Percent |
|---|---|
| PTFE-2 (solids in aqueous dispersion) | 33.80 |
| Nonylphenolpolyethoxy nonionic surfactant | 3.38 |
| Water | 34.82 |
| PEA (solids in aqueous dispersion) | 6.10 |
| Octylphenolpolyethoxy nonionic surfactant | 2.03 |
| Mica Iriodin 153 from MERCK | 1.00 |
| Ultramarine blue pigment | 0.52 |

TABLE 8-continued

Intermediate Coat

| Ingredients | Weight Percent |
|---|---|
| Alumina 0.35–0.50 micrometers | 2.39 |
| Triethanolamine | 5.87 |
| Cerium octoate | 0.57 |
| Oleic acid | 1.21 |
| Butylcarbitol | 1.52 |
| Solvesso 100 hydrocarbon | 1.90 |
| Acrylic resin | 4.89 |
| Total | 100 |

TABLE 9

Topcoat

| Ingredients | Weight Percent |
|---|---|
| PTFE-2 (solids in aqueous dispersion) | 40.05 |
| Nonylphenolpolyethoxy nonionic surfactant | 4.00 |
| Water | 35.56 |
| PFA (solids in aqueous dispersion) | 2.11 |
| Octylphenolpolyethoxy nonionic surfactant | 1.36 |
| Mica Iriodin 153 from MERCK | 0.43 |
| Cerium octoate | 0.59 |
| Oleic acid | 1.23 |
| Butylcarbitol | 1.55 |
| Triethanolamine | 5.96 |
| Solvesso 100 hydrocarbon | 1.94 |
| Acrylic resin | 5.22 |
| Total | 100 |

Figure 2:
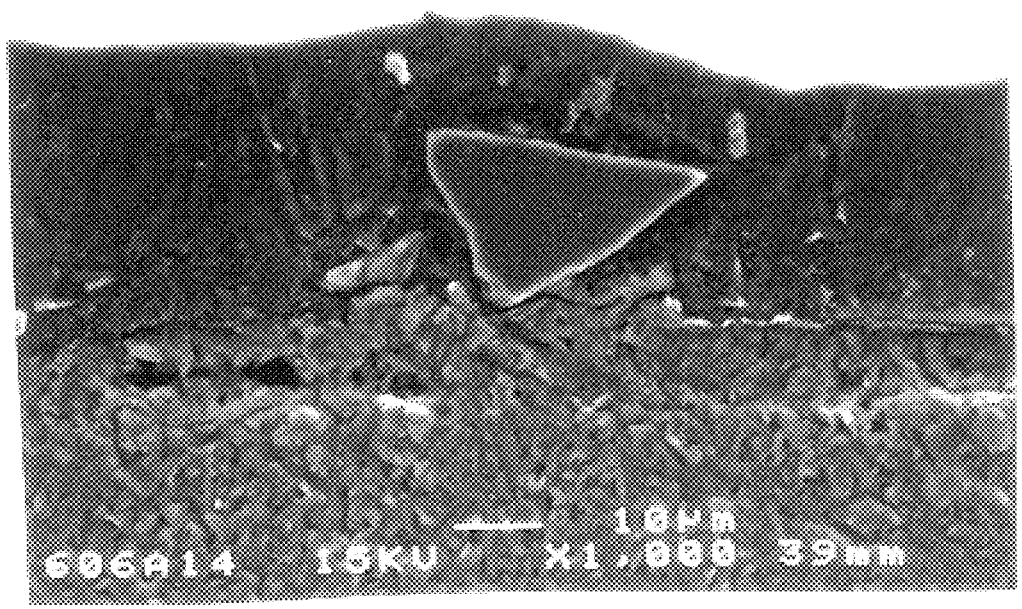
FIG. 2 is a scanning electron micrograph at 1000 magnification of a transverse cross-section of a coated substrate showing a SiC particles in the undercoat and a deflection point in the surface of the coating.

A SEM micrograph of the cross-section of the multi-layer coating is shown in FIG. 2. Because of the presence of large particles in the coating, at each particle area where the ratio a/b is in the range 0.8–2.0, there is a deflection point. The large particle in FIG. 2 has an aspect ratio (b/s) of 0.6, an a/b ratio of 1.0 and a deflection point in the surface of the coating is shown above the particle.

The coating of this Example 3 has about 80 deflection points per 1 cm transverses cross-section. Such coating resists for at least 3 hours the MTP abrasion test as described above. In comparison, an abrasion pattern is obtained after only from 90–120 minutes with a commercial multi-coat system similar to that described in U.S. Pat. No. 5,160,791 Table 1 that has no silicon carbide in it.

Similar results are obtained with the SPAT test using P1200 alumina sandpaper. After 3000 cycles the coating reinforced with SiC shows very little visible signs of abrasion and only a few microns of film thickness loss. In comparison, a multi-coat system that is similar to that described in U.S. Pat. No. 5,160,791 Table 1 that has no silicon carbide in it as a total abrasion failure through to the metal after the same number of cycles.

Substrates prepared per this example are also subjected to the MUST test as described above. The test has the attribute of performing a combination of abrasion and scratch testing on a substrate sample. Using the weighted oscillating triangular metal lathe bit, the non-stick surface of a substrate sample is subjected to a series of three tests to determine number of cycles until bare metal is exposed. For this sample, the test results show that bare metal is exposed after 303, 334, 265 cycles respectively with an average of 301 cycles. In comparison, test results for a commercial multi-coat system similar to that described in U.S. Pat. No. 5,160,791 Table 1 that has no silicon carbide in it, show that bare metal is exposed after 135, 135, 135 cycles respectively with an average of 135 cycles.

Example 4

Figure 3:
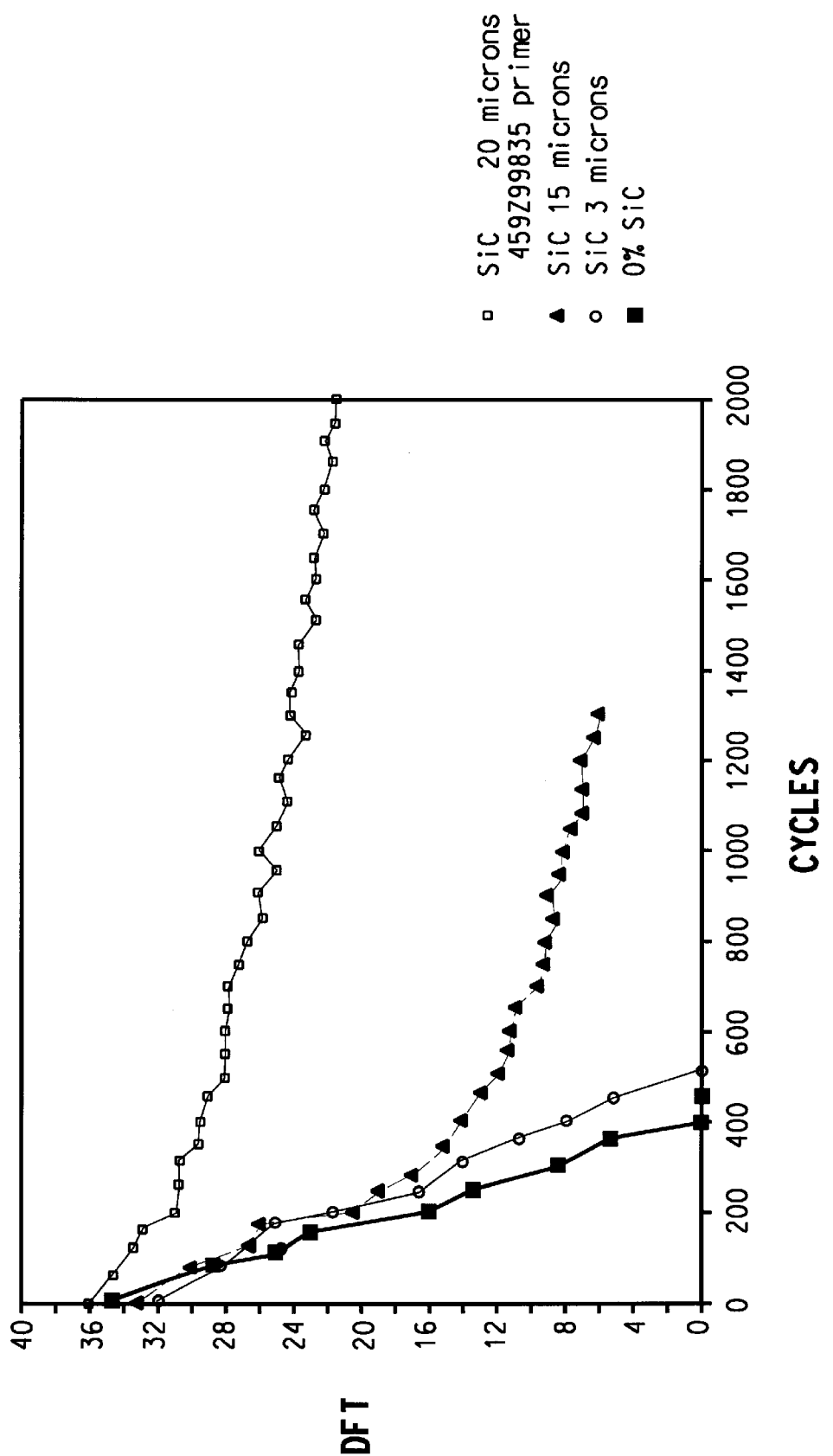
FIG. 3 is a graph that shows the relation of SiC particle size at a constant load to abrasion resistance.

Similar to Example 3, a series of smooth aluminum test panels are coated 3-coat non-stick system of primer/intermediate coat/topcoat. The primer composition on one panel contains no SiC particles in it. The other panels have primers each with 8.3 wt % SiC particles of a different particle size (3 micrometers avg., 15 micrometers, avg.,>25 (blend as shown in Table 7) micrometers avg., respectively) All panels are overcoated with a intermediate coat and topcoat as described in Example 3. The abrasion resistance of the coating is tested using the SPAT test, sanding with P320 alumina sandpaper under a load of 4.211 Kg. After each 50 cycles the sandpaper is renewed and the film build is measured. The results are shown in FIG. 3. FIG. 3 is a graph that shows the relation of SiC particle size at a constant load of 8.3% by weight in the primer to abrasion resistance. The dry film thickness (dft) is plotted against the number of cycles of abrasion to determine the amount of film loss. With a multi-coat system having small particles (3 microns) in the primer, the loss in film build is almost the same as for the primer without any SiC. With large SiC particles (>25 microns) in the primer the abrasion resistance is much improved. Intermediate results are obtained with 15 microns SiC particles size.

Example 5

Similar to Example 3, a series of smooth aluminum test panels are coated 3-coat non-stick system of primer/intermediate coat/topcoat. The primer composition on panels vary in the amount SiC particles. The SiC powder in all primers is a blend of three grades P320/P400/P600 at the weight ratio of 20/40/40. All panels are overcoated with a intermediate coat and topcoat as described in Example 3.

Figure 4:
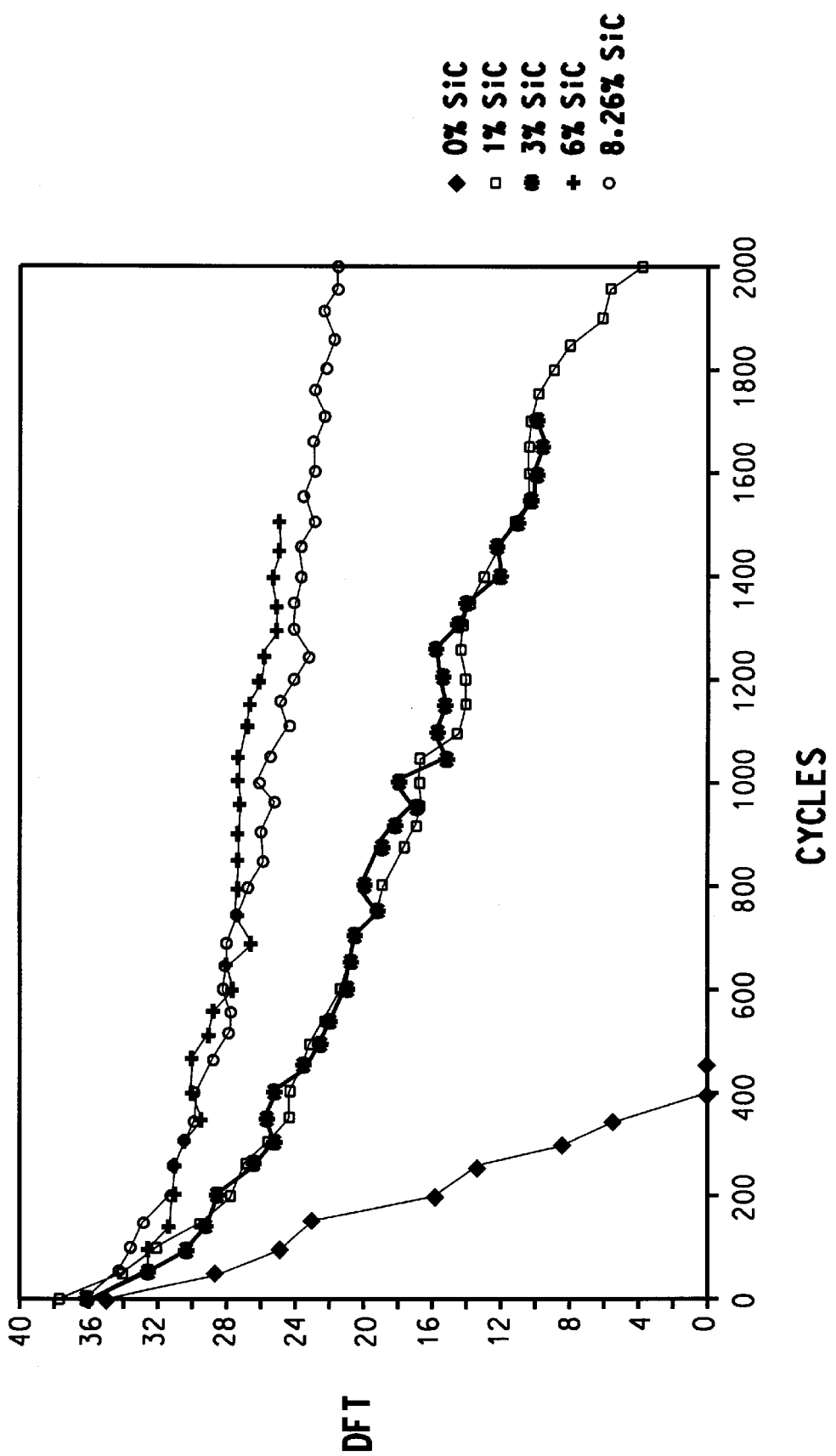
FIG. 4 is a graph that shows the relation of concentration of large particles of SiC to abrasion resistance.

The abrasion resistance of the coating is tested using the SPAT test, sanding with P320 Alumina sandpaper under a load of 4.221 Kg. After each 50 cycles the sandpaper is renewed and the film build is measured. The results are shown in FIG. 4. FIG. 4 is a graph that shows the relation of % weight SiC to the abrasion resistance (loss in film build). The dry film thickness (dft) is plotted against the number of cycles of abrasion to determine the amount of film loss. For greater amounts of large particle SiC there is less film loss from abrasion.

The number of deflection points are also measured by SEM examination of the film cross-section for each sample tested for abrasion. A higher concentration of ceramic results in a higher number of deflection points in the coating surface. The results are shown in the Table 10 below.

TABLE 10

SiC Concentration

| % SiC by Weight in Primer | Number of Deflection Points per cm |
|---|---|
| 0 | 0 |
| 1 | 3 |

TABLE 10-continued

SiC Concentration

| % SiC by Weight in Primer | Number of Deflection Points per cm |
|---|---|
| 3 | 10 |
| 6 | 19 |
| 8.3 | 28 |

The results clearly show that the number of deflection points increases with the concentration of the filler and promotes better abrasion resistance. Abrasion resistance is achieved with at least 3 deflection points per cm of transverse cross-section of the coating.

What is claimed is:

1. A primer composition capable of forming an adherent coating to a substrate and exhibiting abrasion resistance, comprising fluoropolymer, polymer binder and inorganic filler film hardener, the fluoropolymer to polymer binder weight ratio being 0.5 to 2.0:1 and the filler film hardener to fluoropolymer weight ratio being at least 1.4:1, at least 30 wt % of said filler film hardener comprising large ceramic particles having an average particle size of at least 14 micrometers and a Knoop hardness of at least 1200, said fluoropolymer being polytetrafluoroethylene or a copolymer of tetrafluoroethylene and at least one fluorinated copolymerizable monomer.

2. The primer composition of claim 1 wherein at least 30 wt % of said filler film hardener comprises large ceramic particles having an average particle size of at least 20 micrometers.

3. The primer composition of claim 1 wherein said particles have an aspect ratio of not greater than 2.5.

4. The primer composition of claim 1 wherein the amount of said large particles is sufficient to provide at least 3 such particles per 1 cm length of transverse cross section of said coating formed from said composition.

5. The primer composition of claim 1 wherein said substrate is smooth.

6. The primer composition of claim 1 wherein said filler film hardener also comprises small ceramic particles, said small ceramic particles having an average particle size less than 14 micrometers.

7. The primer composition of claim 6 wherein the ratio of the thickness of said coating to the longest diameter of said large ceramic particles is in the range of 0.8 to 2.0 and the ratio of the thickness of said coating to the longest diameter of said small ceramic particles is more than 2.

8. The primer composition of claim 1 wherein said filler film hardener includes silicon carbide.

9. The primer composition of claim 1 wherein said filler film hardener includes aluminum oxide.

10. The primer composition of claim 1 in the form of an aqueous dispersion, said fluoropolymer having been made by aqueous dispersion polymerization, the aqueous dispersion form of said composition including the aqueous dispersion in which said fluoropolymer was made.

11. A composition capable of forming an adherent coating to a substrate and exhibiting abrasion resistance, comprising fluoropolymer, polymer binder and inorganic filler film hardener, wherein at least 30 wt % of said filler film hardener comprises large ceramic particles having an average particle size of at least 14 micrometers and small ceramic particles having an average particle size less than 14 micrometers, the amount of said large particles is sufficient to provide at least 3 such particles per 1 cm length of transverse cross section of coating formed from said composition, said large ceramic particles having a Knoop hardness of at least 1200 and said fluoropolymer being polytetrafluoroethylene or a copolymer of tetrafluoroethylene and at least one fluorinated copolymerizable monomer.

12. The composition of claim 11 wherein the filler film hardener comprises large ceramic particles having an average particle size of at least 20 micrometers.

13. The composition of claim 11 wherein said large ceramic particles have a Knoop hardness of at least 1500.

14. The composition of claim 11 wherein the ceramic particles are selected from a group consisting of inorganic nitrides, carbides, borides and oxides.

15. The composition of claim 11 which is an aqueous dispersion.

16. The composition of claim 15 further comprising an organic liquid.

17. The composition of claim 11 further comprising an organic liquid.

18. A substrate coated with the composition of claim 11 said composition forming a single coat system on said substrate.

19. The composition of claim 11 wherein said large particles are of silicon carbide.

20. The composition of claim 11 wherein said large particles are of aluminum oxide.

21. The composition of claim 11 wherein said substrate is smooth.

22. A substrate coated with a non-stick coating which resists abrasion force, said coating comprising a fluoropolymer resin containing large ceramic particles to deflect said abrasion force away from said coating and small ceramic particles, wherein the ratio of the thickness of said coating to the longest diameter of said large ceramic particles is in the range of 0.8–2.0 and the ratio of the thickness of said coating to the longest diameter of said small ceramic particles is more than 2.

23. A coating composition comprising fluoropolymer and inorganic filler film hardener, wherein said filler film hardener comprises small ceramic particles having an average particle size of less than 14 micrometers and large ceramic particles having an average particle size of at least 14 micrometers.

24. The coating composition of claim 23 wherein with respect to the coating formed from said composition, the ratio of the thickness of said coating to the longest diameter of said large ceramic particles is in the range of 0.8 to 2.0 and the ratio of the thickness of said coating to the longest diameter of said small ceramic particles is more than 2.

25. The coating composition of claim 23 wherein said large ceramic particles are of silicon carbide and said small ceramic particles are of aluminum oxide.

26. The coating composition of claim 23 wherein said small ceramic particles include particles which are 0.35 to 0.5 micrometers in diameter.

27. The coating composition of claim 23 wherein at least 30 wt % of said filler film hardener comprises said large ceramic particles.

28. The coating composition of claim 23 wherein said large ceramic particles have a Knoop hardness of at least 1500.

* * * * *

UNITED STATES PATENT AND TRADEMARK OFFICE
CERTIFICATE OF CORRECTION

PATENT NO.   : 6,592,977 B2
DATED        : July 15, 2003
INVENTOR(S)  : Phillipe Andre Fernand Thomas, Walter Andre Jules Stokes and Anne Buegman It is certified that error appears in the above-identified patent and that said Letters Patent is hereby corrected as shown below:

<u>Title page,</u>
Item [75], Inventor, "Phillipe Andre Fernand Thomas" should be
-- Phillippe Andre Fernand Thomas --

Signed and Sealed this

Twenty-third Day of December, 2003

JAMES E. ROGAN
*Director of the United States Patent and Trademark Office*